United States Patent [19]
Kappel

[11] Patent Number: 6,144,988
[45] Date of Patent: Nov. 7, 2000

[54] COMPUTER SYSTEM AND METHOD FOR SECURELY FORMATTING AND MAPPING DATA FOR INTERNET WEB SITES

[75] Inventor: George T. Kappel, St. Charles, Ill.

[73] Assignee: Experian Marketing Solutions, Inc., Schaumburg, Ill.

[21] Appl. No.: 09/121,291

[22] Filed: Jul. 23, 1998

[51] Int. Cl.[7] .................................................. G06F 13/00
[52] U.S. Cl. ........................................................ 709/202
[58] Field of Search ..................... 364/DIG. 1 MS File, 364/DIG. 2 MS File; 709/200, 202, 203

[56] References Cited

U.S. PATENT DOCUMENTS

| | | | |
|---|---|---|---|
| 4,305,059 | 12/1981 | Benton | 340/825.33 |
| 4,578,530 | 3/1986 | Ziedler | 178/22.09 |
| 4,734,858 | 3/1988 | Schlafly | 364/408 |
| 4,755,940 | 7/1988 | Brachtl et al. | 364/408 |
| 4,775,935 | 10/1988 | Yourick | 364/401 |
| 4,795,890 | 1/1989 | Goldman | 235/380 |
| 4,799,156 | 1/1989 | Shavit et al. | 364/401 |
| 4,812,628 | 3/1989 | Boston et al. | 235/380 |
| 4,827,508 | 5/1989 | Shear | 380/4 |
| 4,922,521 | 5/1990 | Krikke et al. | 379/95 |
| 4,935,870 | 6/1990 | Burk, Jr. et al. | 364/200 |
| 4,947,028 | 8/1990 | Gorog | 235/381 |
| 4,977,595 | 12/1990 | Ohta et al. | 380/24 |
| 4,982,346 | 1/1991 | Girouard et al. | 364/550 |
| 4,992,940 | 2/1991 | Dworkin | 364/401 |
| 5,025,373 | 6/1991 | Keyser, Jr. et al. | 364/408 |
| 5,060,153 | 10/1991 | Nakagawa | 364/405 |
| 5,077,607 | 12/1991 | Johnson et al. | 358/86 |
| 5,220,501 | 6/1993 | Lawlor et al. | 364/408 |
| 5,247,575 | 9/1993 | Sprague et al. | 380/9 |
| 5,305,195 | 4/1994 | Murphy | 364/401 |
| 5,336,870 | 8/1994 | Hughes et al. | 235/379 |
| 5,341,429 | 8/1994 | Stringer et al. | 380/23 |
| 5,347,632 | 9/1994 | Filepp et al. | 395/200 |
| 5,351,186 | 9/1994 | Bullock et al. | 364/401 |

(List continued on next page.)

FOREIGN PATENT DOCUMENTS

| | | | |
|---|---|---|---|
| 0542298 A2 | 5/1993 | European Pat. Off. | G07F 7/10 |
| WO 91/16691 A1 | 10/1991 | United Kingdom | G07F 7/10 |
| 2102606A | 2/1993 | United Kingdom . | |
| WO 95/16971 A1 | 6/1995 | WIPO | G06F 157/00 |

OTHER PUBLICATIONS

A Method for Obtaining Digital Signatures and Public–Key Cryptosystems, R.L. Riverst, A. Shamir and L. Adleman, , pp. 1–15 (Abstract), undated.

Internet Billing Service Design and Protype Implementation, Marvin A. Sirbu, pp. 1–19 (Abstract), No date.

Electronic Wallet, Shimon Even, Oded Goldreich, pp. 383–386, No date.

(List continued on next page.)

*Primary Examiner*—Robert B. Harrell
*Attorney, Agent, or Firm*—Jenkens & Gilchrist

[57] ABSTRACT

A computer system is provided for processing data for an internet web site. The web site is run by a web server that includes a server interface and a processing servlet. The processing servlet is programmed to accept a message including user data from a user of the internet web site. The user data is then mapped from a native format to a universal format. The computer system further includes a remote server that is connected to the web server by the internet. The remote server is programmed to receive the universal format user data. It also processes the universal format user data to produce final universal format user data which may include standardized user data and additional data which is then sent over the internet to the processing servlet. The processing servlet is further programmed to analyze the final universal format user data and map the final universal format user data to final native format user data. The processing servlet then sends the final native format user data to the server interface. The server interface then sends next page data to the processing servlet. The processing servlet then returns the next page data to the user's browser. The processing servlet and the remote server are each programmed to perform all of the above steps in real-time.

45 Claims, 12 Drawing Sheets

U.S. PATENT DOCUMENTS

| | | | |
|---|---|---|---|
| 5,351,293 | 9/1994 | Michener et al. | 380/21 |
| 5,383,113 | 1/1995 | Kight et al. | 364/401 |
| 5,414,833 | 5/1995 | Hershey et al. | 395/575 |
| 5,708,780 | 1/1998 | Levergood et al. | 395/200 |
| 5,715,314 | 2/1998 | Payne et al. | 380/24 |
| 5,848,396 | 12/1998 | Gerace | 705/10 |

OTHER PUBLICATIONS

Universal Electronic Cash, Tatsuaki Okamoto, Kazuo Ohta, pp. 324–337 (Abstract), No date.
How to Break and Repair "Provably Secure"0 Untraceable Payment System, Birgit Pfitzmann, Michael Waldner, pp. 338–350 (Abstract), No date.
Paying Bills Electronically, pp. 171–191, No date.
Shopping, CompuServe, pp. 109–113, No date.
Notes on Community Information Systems, David K. Cifford, Dec. 1989, pp. 1–5.
Active Message Processing: Messages As Messengers, John Vittal, pp. 175–194, No date.
Centre for Mathematics and Computer Science, J.N.E. Bos, D. Chaum, Aug., pp. 1–8.
American National Standard, Aug. 1986, pp. 1–38.
American National Standard, May 1988.
Achieving Electronic Privacy, David Chaum, Aug. 1992, pp. 96–101.
Value Exchange Systems Enabling Security and Unobservability, Holger Bück, Andreas Pfitzmann, pp. 715–721, No date.
Untraceable Electronic Cash, David Chaum, Amos Fiat, Moni Naor, pp. 319–327 (Abstract), No date.
IC–Cards In High–Security Applications, pp. 177–199, No date.
Proxy–Based Authorization and Accounting for Distributed Systems, B. Clifford Neuman, May 1993 (Abstract).
Electronic Currency for Internet, pp. 30–31, No. date.
UEPS–A Second Generation Electronic Wallet, Ross J. Anderson, pp. 411–418, No date.
Why Cryptosystems Fail, Ross Anderson, pp. 215–227 (Abstract), No date.
SNPP: A Simple Network Payment Protocol, Semyon Dukach (Abstract), No date.
NetCash: A Design for Practical Electronic Currency On the Internet, Gennady Medvinsky, B. Clifford Newuman (Abstract), No date.
The Industry Standard for Linking Financial Institutions, pp. 1–27, No date.
Case Study: The Cirrus Banking Network, David Gifford, Alred Spector, Aug. 1985, pp. 797–807, No date.
The Basic Element of An EFTS, pp. 43–46, No date.
Authentication and Delegation with Smart–Cards, M. Abadi, M. Burrows, C. Kaufman, B. Lampson, Jul. 1992, pp. 1–24.
Internet Billing Server Protype Scope Document INI Technical Report 1993–1, Oct. 1993, pp. 1–29.
Concept For A Smart Card Kerberos, Jajan Krajewski, Jr. (Abstract), No date.
Smart Card Augmentation of Kerberos, Marjan Krajeski, Jr. (Abstract), No date.
Applicability of Smart Cards to Network User Authentication, Jarjan Krajewski, John C. Chipchak, David A. Chodorow, Jonathan T. Trostle, 1994, pp. 75–89.
Case Study: The VISA Transaction Processing System, Kieran Harty, Linda Ho, May 1988, pp. 1–23.
Bank Card Originated Messages–Interchange Message Specifications–Content for Financial Transactions, 1987, pp. 1–34.
The MD5 Message–Digest Algorithm, R. Rivest, , Apr. 1992, pp. 1–21.
Security Mechanisms in High–Level Network Protocols, Victor L. Voydock, Stephen T. Kent, Jun. 1983, pp. 1–171.
Adding Capability Access to Conventional File Servers, Roger M. Needham, pp. 3–4, No date.
Object Migration and Authentication, Virgil D. Gligor, Bruce G. Lindsay, 1979, pp. 607–611.
Implementing Capability–Based Protection Using Encryption, D. Chaum, R.S. Fabry, Jul. 1978, pp. 1–10.
Cryptographic Sealing for Information Secrecy and Authentication, David K. Gifford, Apr. 1982, pp. 274–286.
Mosaic Communications Unveils Network Navigator and Server Software for the Internet, No date.
The Secure HuperText Transfer Protocol, E. Recorla, A. Schiffman, Jun. 1994.
Development of Network Infrastructure and Services for Rapid Acquisition, Jay Tenenbaum, Allan Schiffman, pp. 1–19, No date.
Computerized Commerce, Danny Cohen, Sep. 1989, pp. 1095–1100.
Electronic Commerce, Danny Cohen, Oct. 1989, pp. 1–42.
Payment Systems, pp. 215–235, No date.
1Power Technology, No date.

Form 45

| First |
|---|
| Last |
| Firm |
| Address |

Form 56

| Last, First, Middle; Address, City, State, Zip |
|---|

Universal Format

| Name |
|---|
| Primary Address |
| Secondary Address |
| City |
| Firm |
| Zip |
| State |

*FIG. 3*

```
<HTML><Body>
Thanks for Registering
<IMG SRC = "company.com? idnum = 123">
<\Body><\HTML>
```

*FIG. 11*

COMPUTER SYSTEM AND METHOD FOR SECURELY FORMATTING AND MAPPING DATA FOR INTERNET WEB SITES

FIELD OF THE INVENTION

The present invention relates generally to the Internet. More particularly, it concerns a computer system and method for processing data for an Internet web site.

BACKGROUND OF THE INVENTION

The Internet is a world-wide network of computers. The Internet is comprised of thousands of smaller regional networks scattered throughout the world. The World-Wide Web is mostly used on the Internet; however, the web refers to a body of information, while the Internet refers to the physical global computer network.

Information on the World-Wide Web is accessible to people around the world. The information on the web is linked with other information on the web so that information can be easily found. The links on the web are made possible by using HyperText and HyperMedia. HyperText is the same as regular text; however, HyperText allows a user to hyperlink to other documents. Likewise, HyperMedia contains links to graphics, audio, and video files.

In a HyperText system, you simply click on a HyperText word or phrase to connect with another document. In this way, related information is linked together and connections to other documents are made easily.

The web is a mass of interconnected web servers. Web servers are software applications that run on computers connected to the Internet. Web servers manage network resources, such as applications, web sites, etc. For example, a web file server is a computer and storage device dedicated to storing files. Any user on the network can store files on the file server. A web print server is a computer that manages one or more printers. A web network server is a computer that manages network traffic and a web database server is a computer that processes database queries.

A servlet is a standard software approach for extending server functionality without the limitations of common gateway interface (CGI) based or server-specific approaches. A CGI is a set of rules that describe how a web server communicates with another piece of software on the same machine, and how the other piece of software (the CGI program) talks to the web server.

A web browser is a program that interfaces with the user and requests documents from a server as the user asks for them. A user can locate and display web pages by using a web browser.

The standard language the web uses for creating and recognizing HyperText and HyperMedia documents is the HyperText Markup Language (HTML). HTML is a standard that controls how the World Wide Web works. It covers how web pages are formatted and displayed. HTML is related to the Standard Generalized Markup Language (SGML), a widely used document formatting language. SGML is a system for organizing and tagging elements of a document. HTML is one way of defining and interpreting tags according to SGML rules. HTML supports links to other documents, as well as graphics, audio, and video files. This means users can jump from one document to another by simply clicking on hyperlinks.

Web documents are typically written in HTML and are usually named with the suffix ".html". HTML documents are nothing more than standard 7-bit ASCII files with formatting codes that contain information about layout (text styles, document titles, paragraphs, lists) and hyperlinks.

HTML uses Uniform Resource Locators (UTRLs) to represent hyperlinks and links to network services within documents. It is possible to represent nearly any file or service on the Internet with a URL. A URL is the global address for documents and other resources on the web. An example of a URL address is: http:/www.dv2u.com. The first part of the URL (before the two slashes) specifies the method of access, i.e., what protocol to use (FTP, HTTP, etc.). The second part is typically the Internet protocol (IP) address or domain name of the computer where the data or service is located. Further parts may specify the names of files, the port to connect to, or the text to search for in a database.

Most web browsers allow the user to specify a URL and connect to that document or service. When selecting HyperText in an HTML document, the user is actually sending a request to open a URL. In this way, hyperlinks can be made not only to other texts and media, but also to other network services.

HyperText Transmission Protocol (HTTP) is the underlying protocol used by the World Wide Web. This computer protocol allows browsers and servers to communicate with each other. All browsers and servers communicate in HTTP in order to send and receive HyperText and HyperMedia documents. For this reason, web servers are often called HTTP servers. HTTP defines how messages are formatted and transmitted. For example, when a user enters a URL, this actually sends an HTTP command to the web server directing it to fetch and transmit the requested web page.

A cookie is a message given to a web browser by a web server. The browser stores the message in a file typically called cookie.txt. The message is then sent back to the server each time the browser requests a page from the server. A typical use of cookies is to identify users and possibly prepare customized web pages for them. When a user enters a web site using cookies, the user may be asked to fill out a form providing information such as the user's name and interests. This information is packaged into a cookie and sent to the user's web browser which stores it for later use. The next time that user goes to the same web site, the user's browser will send the cookie to the web server. The server can use this information to present custom web pages to the user.

The name cookie derives from UNIX objects called magic cookies. These are tokens that are attached to a user or program and change depending on the areas entered by the user or program. Cookies are also sometimes called persistent cookies because they typically stay in the browser for long periods of time.

Advertisers are now targeting the world-wide audience connected to the Internet. Advertisers display ads on web sites in hopes of selling their goods or services. By use of cookies, advertisers can target the ads that a given user sees. This is favorable to advertisers, but not necessarily users. Privacy concerns have discouraged some advertisers from using cookies which identify particular users. What these advertisers desire is a way to target their ads without violating a user's privacy. That is one of the purposes of the present invention.

SUMMARY OF THE INVENTION

A computer system is provided for processing data for an Internet web site. The web site is run by a web server that includes a server interface and a processing servlet. The processing servlet is programmed to accept a message including user data from a user of the Internet web site. The user data is then mapped from a native format to a universal format. The computer system further includes a remote server that is connected to the web server by the Internet. The remote server is programmed to receive the universal format user data. It also processes the universal format user data to produce final universal format user data which may include standardized user data and additional data which is then sent over the Internet to the processing servlet. The processing servlet is further programmed to analyze the final universal format user data and map the final universal format user data to final native format user data. The processing servlet then sends the final native format user data to the server interface. The server interface then sends next page data to the processing servlet. The processing servlet then returns the next page data to the user's browser. The processing servlet and the remote server are each programmed to perform all of the above steps in real-time.

BRIEF DESCRIPTION OF THE DRAWINGS

Other objects and advantages of the invention will become apparent upon reading the following detailed description and upon reference to the accompanying drawings, in which:

FIG. 3 is a diagram of several registration page formats;

FIG. 11 is a diagram of the content of an HTML image request that includes a user identification number.

DETAILED DESCRIPTION OF THE EMBODIMENTS

I. Overview

Figure 1:
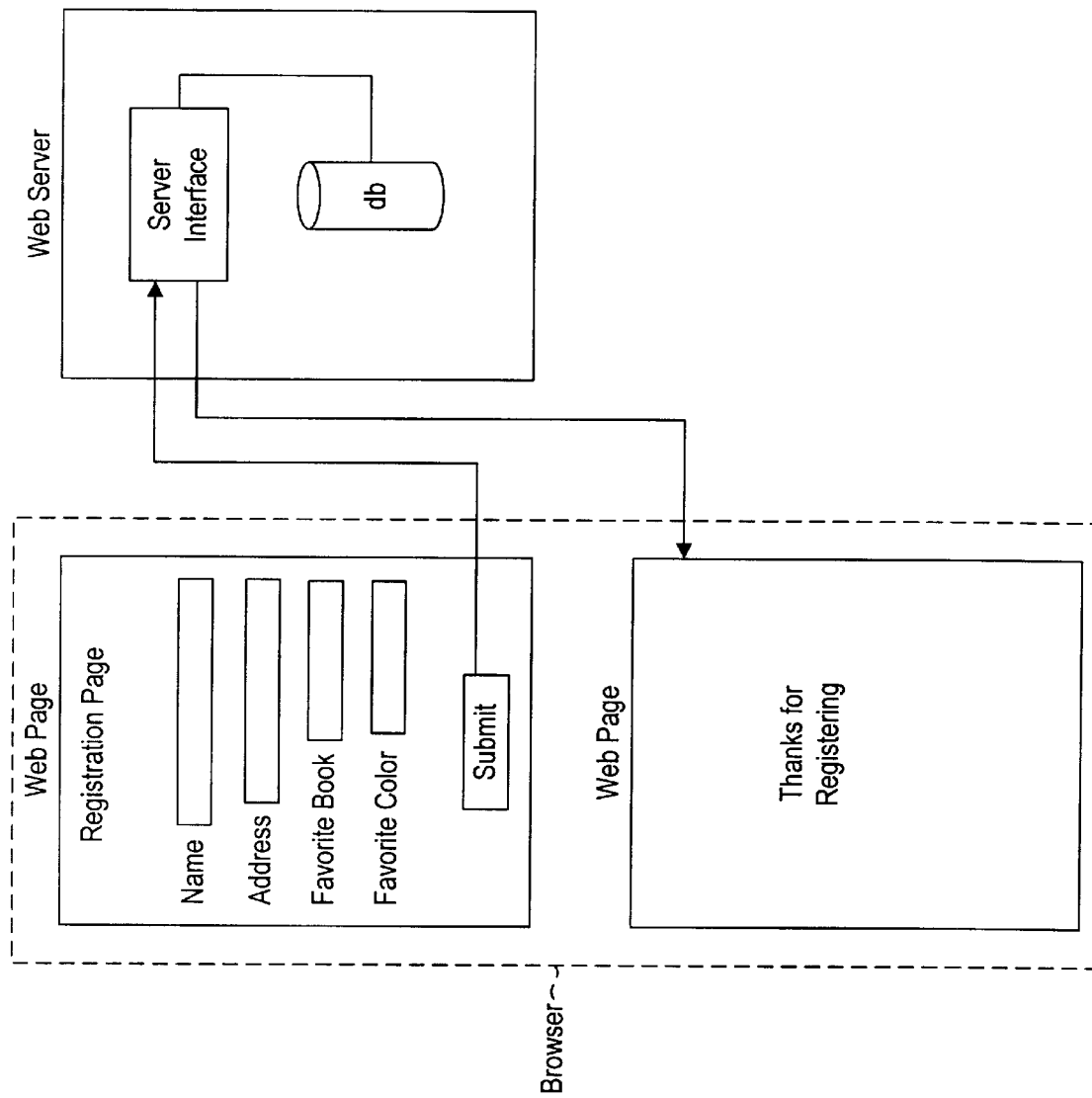
FIG. 1 is a flow diagram of a prior art Internet web site registration system.

In one embodiment, the system of the present invention electronically processes captured address information and returns corresponding information that is standardized and enhanced, all in real-time. The system includes a piece of software called a processing servlet that is capable of being installed on many electronic/interactive environments, such as computers, web servers, databases, point of sale registers, etc. The system allows address information to be standardized in real-time. The system can also enhance the address information by, for example, appending additional data corresponding to the name and address entered. This additional data may include geo-demographic data including the estimated household income, telephone number, median home value, etc. corresponding to, for example, the address information. This additional data may further include product usage information and/or marketing cluster information corresponding to the address information.

In another embodiment, the system standardizes and enhances data in real-time. The system includes a processing servlet that is installed on an Internet web server. The system allows a web site that has a registration page to standardize the address information entered on the registration page in real-time. For example, after a user enters his or her registration data, he or she would then click a "Submit" icon. The address information is then filtered from the registration data by the processing servlet and sent to a remote server that standardizes the address information. The standardized data is returned to the web server. This process ensures that addresses ultimately saved in the web server database satisfy United States Postal Service (U.S.P.S.) address standardization guidelines.

In still another embodiment, the system enhances the registration data entered by the user by, for example, appending additional data corresponding to the name and/or address entered by the user. This additional data may include geo-demographic data, product usage information and/or marketing cluster information about the user. The system standardizes and appends additional data in real-time. All of this is done without the user having to hyperlink to another web site. Rather, the process is transparent to the user and the web server. The user merely enters the registration information requested at the web site and submits the data. Then, while the user is still at the web site, the processing servlet connects to a remote server that standardizes and enhances the data in real time.

Therefore, the present invention provides a computer system for processing data for an electronic/interactive environment, such as an Internet web site. The system includes easy to install and generally deployable processing servlet software capable of operating with, and being transparent to, a web server. The processing servlet software is also capable of providing a third party with additional data regarding web users without providing the identity of the users.

II. Details of Operation

To better understand the present invention, FIG. 1 illustrates how prior web registration pages operated. Prior web registration systems had a Web Server including a Server Interface that was connected to a database. The user entered his or her registration data and sent that registration data to the server interface by clicking a "Submit" icon. The server interface stored the entered registration data in the database and sent next page data to the user's web browser thanking the user for registering. The problem with these prior registration systems is that the registration data saved in the web server's data base has not been verified or standardized to any generally accepted specification. Therefore, a universally deployable data standardization and enhancement system is desirable so that a web site has accurate registration data and additional data, such as geo-demographic data, corresponding to the user.

Figure 2:
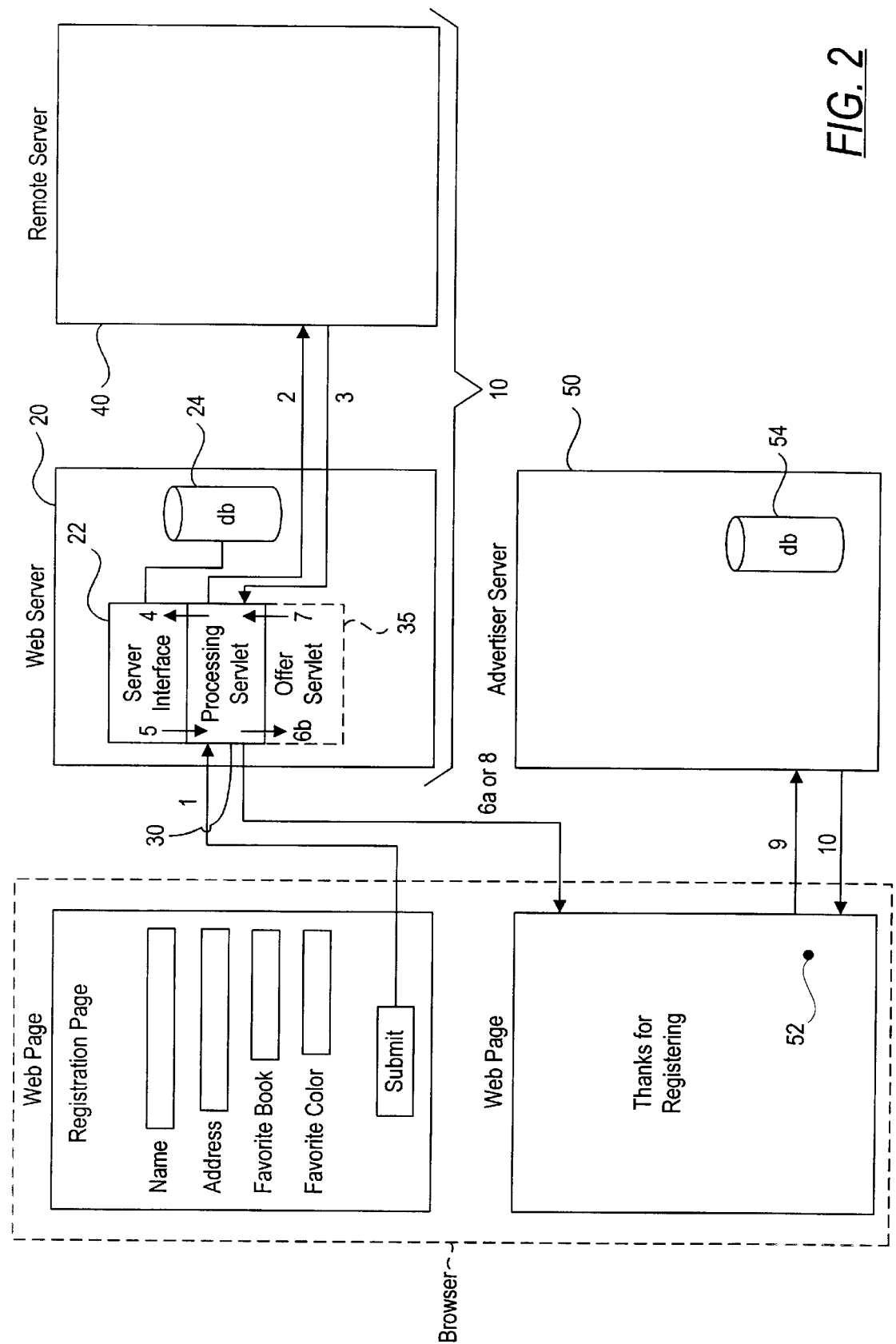
FIG. 2 is a flow diagram of one embodiment of the present invention.

The present invention provides real-time data standardization and enhancement. The flow diagram of FIG. 2 illustrates one embodiment of the present invention. A computer system 10 processes data for an Internet web site. The web site is run by a web server 20 that includes a server interface 22 such as a common gateway interface (CGI), an Internet server API (ISAPI), a Netscape Server API (NSAPI), etc. An API is an application program interface, which is a set of routines, protocols, and tools for building software applications. ISAPI and NSAPI enable programmers to develop web-based applications that run faster than conventional CGI programs. A CGI is a set of rules that describe how a web server communicates with another piece of software on the same machine, and how the other piece of software (the CGI program) talks to the web server. Any piece of software can be a CGI program if it handles input and output according to the CGI standard. Usually a CGI program is a small program that takes data from a web server and does something with it, like putting the content of a form into an B-mail message, turning the data into a database query, or posting the content of a web page.

A universal processing servlet 30 is installed on the web server 20. The easy installation of the universal processing servlet software 30 allows the web server 20 to perform data standardization and enhancement in real-time with minimal changes to the existing web server 20. To install the processing servlet 30 on an existing web server 20 merely requires: copying the processing servlet software 30 to the web server 20, changing the post destination of the web site from the server interface to the processing servlet, and adding a form number that identifies the specific layout of the particular web site's registration page. For example, FIG. 3 illustrates three different registration page layouts. Form 45 depicts a format where the first name, last name and address each have their own field. Form 56 depicts a format where the last name, firm, first name, middle name, street address, city, state and zipcode are all in one field, separated by commas or a semicolon. Other form numbers can be assigned to other registration page layouts. As described in more detail below, the native format registration information is mapped to a universal format where the name, primary address, secondary address, city, firm, zipcode and state each have their own fields. This allows the processing servlet to be installed on any web server with only the three modifications outlined above.

Referring again to FIG. 2, the operation of the processing servlet 30 is transparent to the web server 20. The server interface 22 gets and posts data as it did before installation of the processing servlet 30. Only now, the web site post destination is the processing servlet 30, not the server interface 22. Thus, the processing servlet 30 will now receive a post from a user's web browser, post processed data to the server interface 22 and get next page data from the server interface 22 to return to the user's web browser.

FIG. 2 gives an overview of how the computer system 10 processes data. First, the system 10 receives a "Submit" command from the user's web browser as represented by arrow 1. The processing servlet 30 then posts the user's registration information to a remote server 40 (arrow 2). The remote server 40 returns processed registration information to the processing servlet 30 (arrow 3). The processing servlet 30 then posts the processed registration information to the server interface 22 (arrow 4). The server interface 22 then saves the processed registration information in a database 24. The server interface 22 returns next page data to the processing servlet 30 (arrow 5). The processing servlet 30 then either returns the next page data to the user's browser (arrow 6a) or the next page data is sent to an optional offer servlet 35 (arrow 6b) which appends advertising data to form new next page data. If the latter occurs, the offer servlet 35 sends the new next page data to the processing servlet 30 (arrow 7). Then, the processing servlet 30 returns the new next page data to the user's browser (arrow 8).

The next page data may include an image request. In such a case, the user's browser posts that image request and a user identification number to a third server, such as an advertiser server 50 (arrow 9). The advertiser server 50 then returns the requested image to the user's browser (arrow 10). The image request allows the advertiser server 50 to receive information about the user without the user being identified. This entire process is described in detail below beginning with FIG. 5a.

Figure 4:
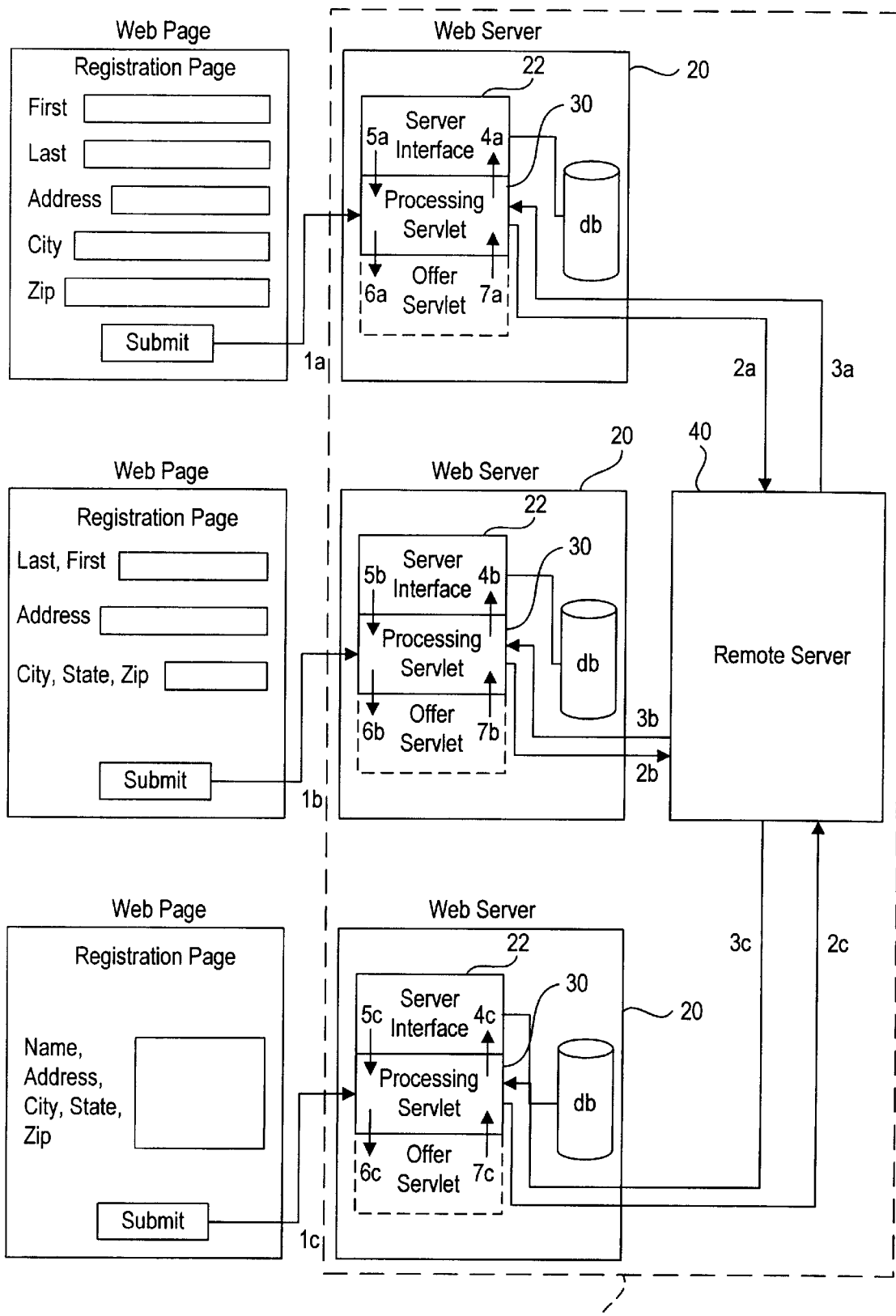
FIG. 4 is a flow diagram of another embodiment of the present invention.

The inventive processing servlet 30 is generally deployable on many types of electronic/interactive environments, such as computers, web servers, databases, point of sale registers, etc. One such environment, illustrated in FIG. 4, provides a computer system 10 for processing data for a plurality of Internet web sites, each with a different registration format. As discussed above, each registration format will be assigned a form number that identifies the specific layout of the particular web site's registration page. This allows the processing servlets 30 to translate the user data from a native format to a universal format, and vice versa. The web sites are run by a plurality of web servers 20 that each include a server interface 22 and a processing servlet 30. Each of the processing servlets 30 is programmed to accept a message, including user data, from a user of one of the Internet web sites as represented by respective arrow 1a, 1b or 1c. Each of the processing servaets 30 is further programmed to map the user data from a native format to a universal format. The computer system 10 include s a remote server 40 that is adapted to be connected to the plurality of web servers 20 by the Internet. The remote server 40 is programmed to receive the universal format user data from one of the processing servlets 30 (arrow 2a, 2b or 2c). The remote server 40 processes the universal format user data to produce final universal format user data that includes standardized address data. The remote server 40 then sends the final universal format user data over the Internet to the processing servlet 30 that originally sent the universal format user data (arrow 3a, 3b or 3c).

The processing servlet 30 then maps the final universal format user data to final native format user data which is in the registration format native to the particular web site. The final universal format user data is unmapped by using the form number assigned to the particular web server 20. The processing servlet 30 then posts the final user data to the server interface 22 (arrow 4a, 4b or 4c). The processing servlet 30 receives next page data from the server interface 22 (arrow 5a, 5b or 5c). The next page data is the content of the next web page that is to be displayed on the web site, i.e., the next web page sent to the user's browser. The processing servlet 30 then returns the next page data to the user's browser. Each of the processing servlets 30 and the remote server 40 are programmed to perform all of the above steps in real-time.

In another embodiment, the remote server 40 is programmed to produce final universal format user data that includes additional data corresponding to the user data. For instance, this additional data may include geo-demographic data, product usage data and/or marketing cluster data corresponding to the user data provided by the user.

Figure 5A:
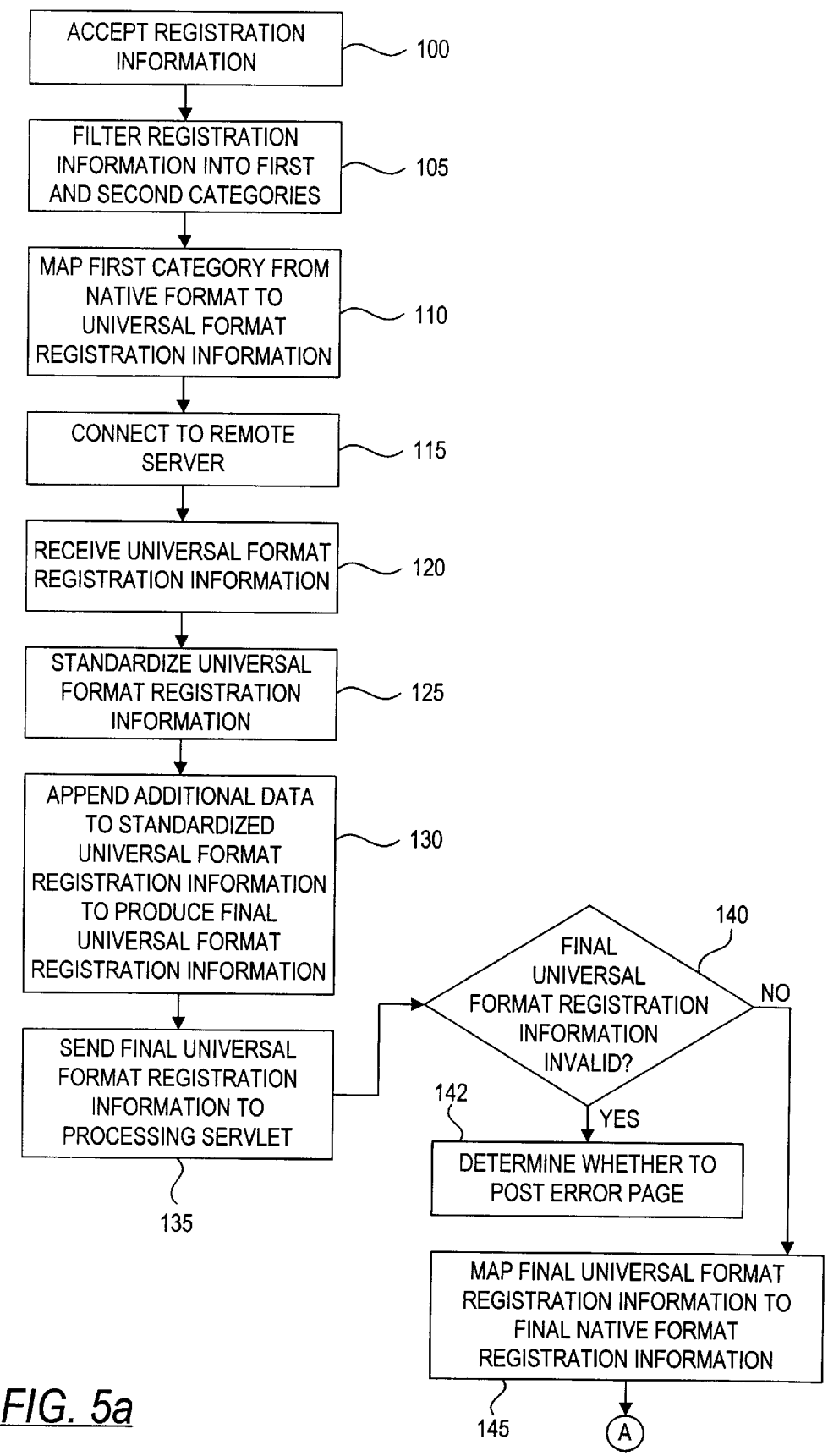
FIGS. 5a and 5b are flow charts of the steps taken in accordance with one embodiment of the present invention.

Referring now to FIGS. 2 and 5a, the processing servlet 30 is programmed to accept registration information in step 100 that is entered by a user on the registration page of a web site (arrow 1). In step 105, the processing servlet 30 filters the registration information into a first category to be processed and a second category to be saved. If, however, the web site registration information contains only first category information such as, for example, the name and address of the user, the filtering step is not required. In one embodiment, where the registration information is filtered, the first category of registration information contains information from the name and address fields of the registration page. In an alternative embodiment, the first category of registration information may contain only the address and/or the telephone number from the corresponding fields of the registration page. In either embodiment, the second category of information corresponds to unrelated information, such as, for example, the user's favorite color, job title, type of computer, etc. Although this type of information may be important to the web site, it is not the type of information that can be standardized according to certain specifications, such as U.S.P.S. address standardization guidelines.

Figure 6:
FIG. 6 shows an example of user-entered and standardized data in one embodiment of the present invention.

For example, addresses can be standardized so that a missing street designation is appended. FIG. 6 illustrates that a user entered an address of "555 W. Fullerton." The system 10 processes that address to produce a standardized address of "555 W. Fullerton Parkway." Similarly, telephone numbers can be standardized so that the web server can store all entered telephone numbers in a common format. For example, if a user enters "(312) 555-1212" the system 10 can standardize the telephone number by returning "1-312-555-1212." In this way, all entered telephone numbers are stored in the same format.

Returning again to FIGS. 2 and 5a, once the registration information is filtered in step 105, the first category of registration information is mapped from a native format to a universal format in step 110. This data mapping is required to allow the processing servlet to be universal. By translating the first category of the registration data to a standard or universal format, the processing servlet can operate on and transfer registration data in the same fashion no matter what format is used by a particular web server. Once the processing servlet 30 is installed, a form number is assigned to the web server that identifies the specific layout of the particular web site's registration page. Using this form number, the processing servlet 30 maps each field of data in the first category to a corresponding universal format for further processing.

The processing servlet 30 in step 115 connects to the remote server 40 over the Internet (arrow 2). This remote server 40 includes several databases and several individual servlet programs designed to perform certain functions. In one embodiment, the remote server 40 is programmed to receive the universal format registration information in step 120. The remote server then standardizes the universal format registration information in step 125. For example, the information can be standardized according to certain specifications, such as Postal Addressing Standards, U.S.P.S. Publication 28. For example, an address can be standardized so that a missing street designation is appended. Additional data is appended to the standardized universal format registration information to produce final universal registration information in step 130. For instance, the additional data may include geo-demographic data, product usage data and/or marketing cluster data corresponding to the registration information provided by the user.

The remote server 40 standardizes and enhances the universal format registration information by comparing that information to an extensive database comprised of address information that complies with U.S.P.S. address standardization guidelines. After a match is found, the universal format registration information is standardized to the U.S.P.S. address standardization guidelines and enhanced with additional data corresponding to the registration information. The remote server 40 is able to enhance the user's registration information by using a database supplied by a company, such as a direct marketing company, which has already compiled consumer data concerning millions of people. This database contains data, such as geo-demographic data, product usage information and/or marketing cluster information corresponding to millions of potential users. In this way, the user's registration information can be enhanced with additional data corresponding to the user's registration information. The final universal format registration information, which includes standardized and enhanced data, is sent in step 135 to the processing servlet 30 (arrow 3).

The processing servlet 30 is further programmed to verify, in step 140, whether the final universal format registration information is valid. If the final universal format registration information is invalid, the processing servlet 30 determines, in step 142, whether to post an error page. Otherwise, the processing servlet continues to step 145. In one embodiment, the error page includes an incorrect address indication and requests the user to re-enter the registration information requested. However, the present invention allows each web server to do whatever it wants with invalid data. The web server could disregard the registration data, have the user re-enter the data, or simply state that registration failed. The processing servlet 30 merely notifies the web server whether the registration information entered is invalid. Each web server can determine what to do with that information as it pleases.

The processing servlet next maps, in step 145, the final universal format registration information to final native format registration information which is in the native format of the particular web server 20. The final universal format registration information is unmapped by using the form number assigned to the web server. This form number identifies the specific layout of a particular web site's registration page. By using this form number, the processing servlet 30 can unmap each field of data in the universal format to the corresponding native format of the web site.

Figure 5B:
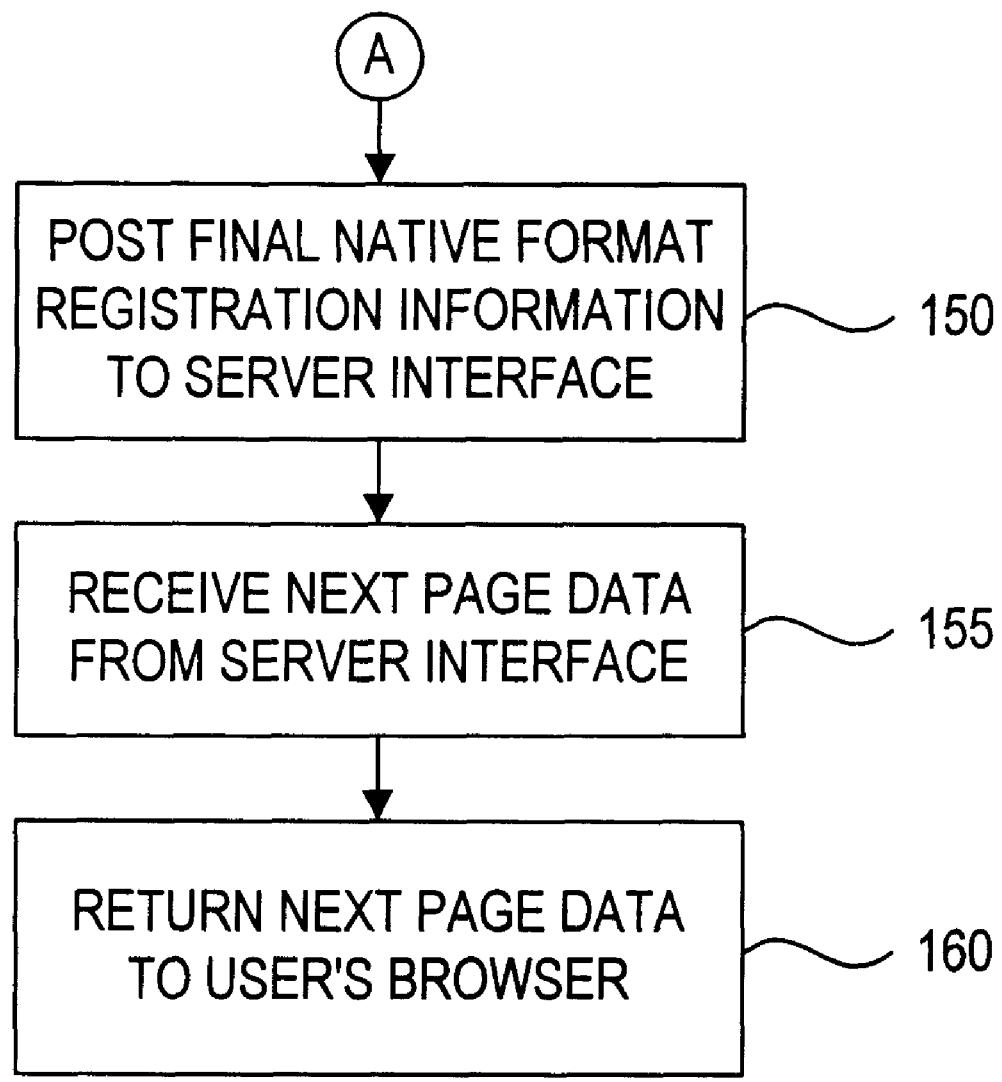

Referring now to FIGS. 2 and 5b, the processing servlet 30 next posts the final native format registration information to the server interface 22 in step 150 (arrow 4). In step 155, the processing servlet 30 receives next page data from the server interface 22 (arrow 5). The next page data is the content of the next web page that is to be displayed on the web site, i.e., the next web page sent to the user's browser. The processing servlet 30 in step 160 returns the next page data to the user's browser (arrow 6a).

Figure 7:
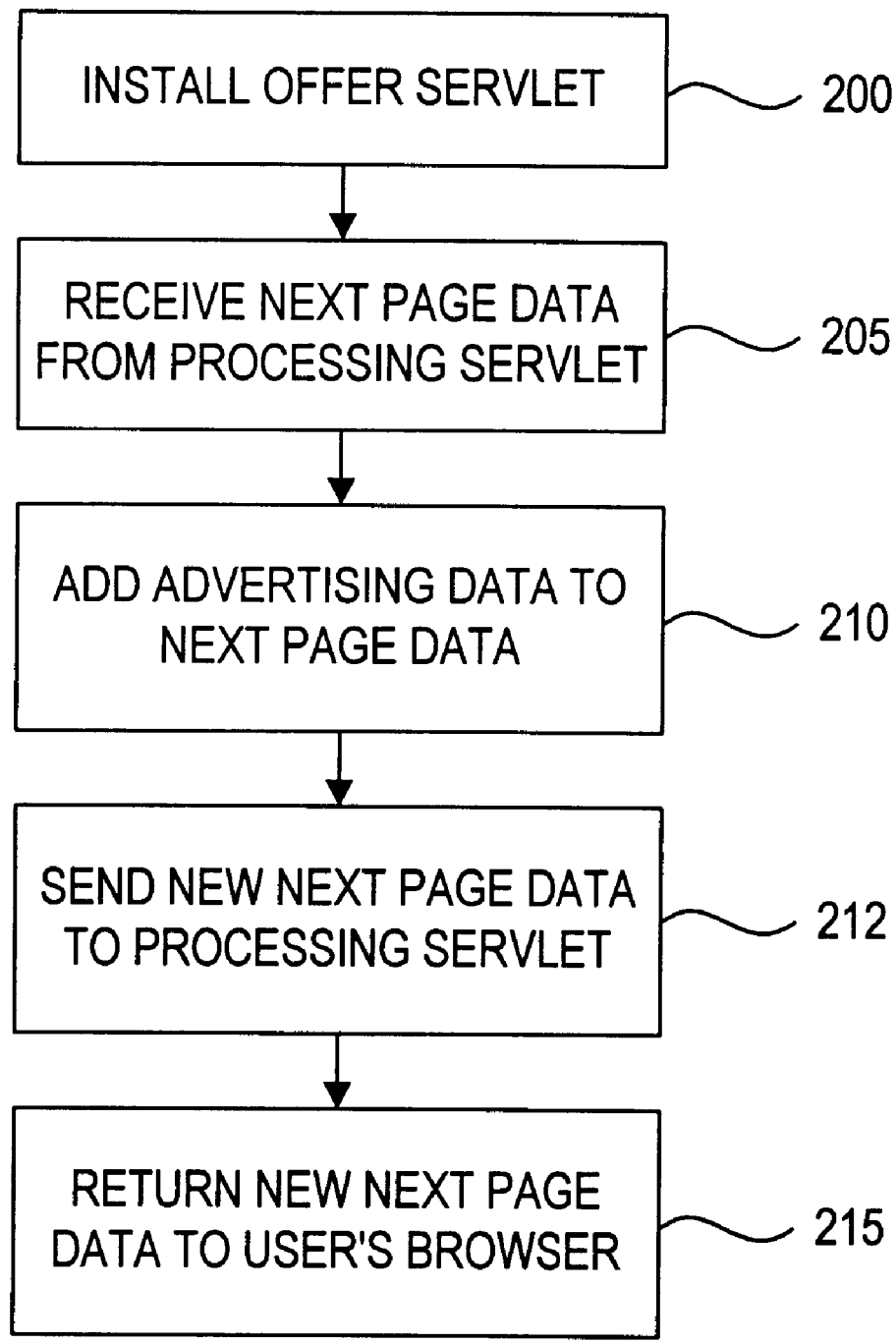
FIG. 7 is a flow chart of the steps taken in accordance with another embodiment of the present invention.

In another embodiment, illustrated in FIGS. 2 and 7, the computer system 10 further includes an offer servlet 35 that is installed on the web server 20 in step 200. The offer servlet is installed by copying the offer servlet program 35 onto the same computer running the web server 20. The offer servlet 35 is programmed to receive the next page data from the processing servlet 30 in step 205 (arrow 6b). Advertising data is added to the next page data in step 210 to form new next page data. The new next page data is sent to the processing servlet 30 in step 212 (arrow 7). The processing servlet 30 is programmed in step 215 to return the new next page data to the user's browser (arrow 8). The advertising data contained in the new next page data may be targeted to the user by using the final native format registration information obtained from the remote server. Alternatively, the advertising data may be a generic ad sent to all users.

Figure 9:
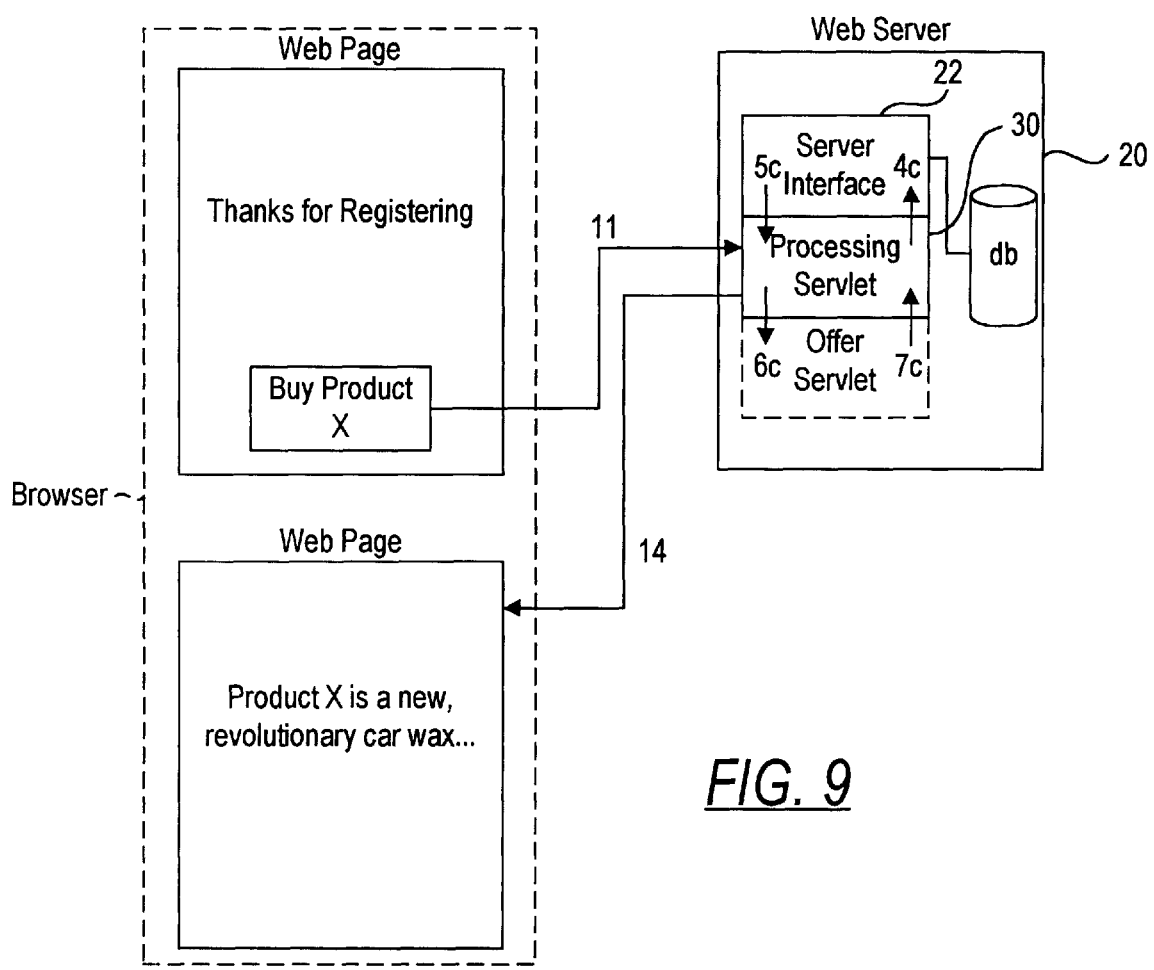
FIG. 9 shows how an advertising inquiry is made by a user.
Figure 8:
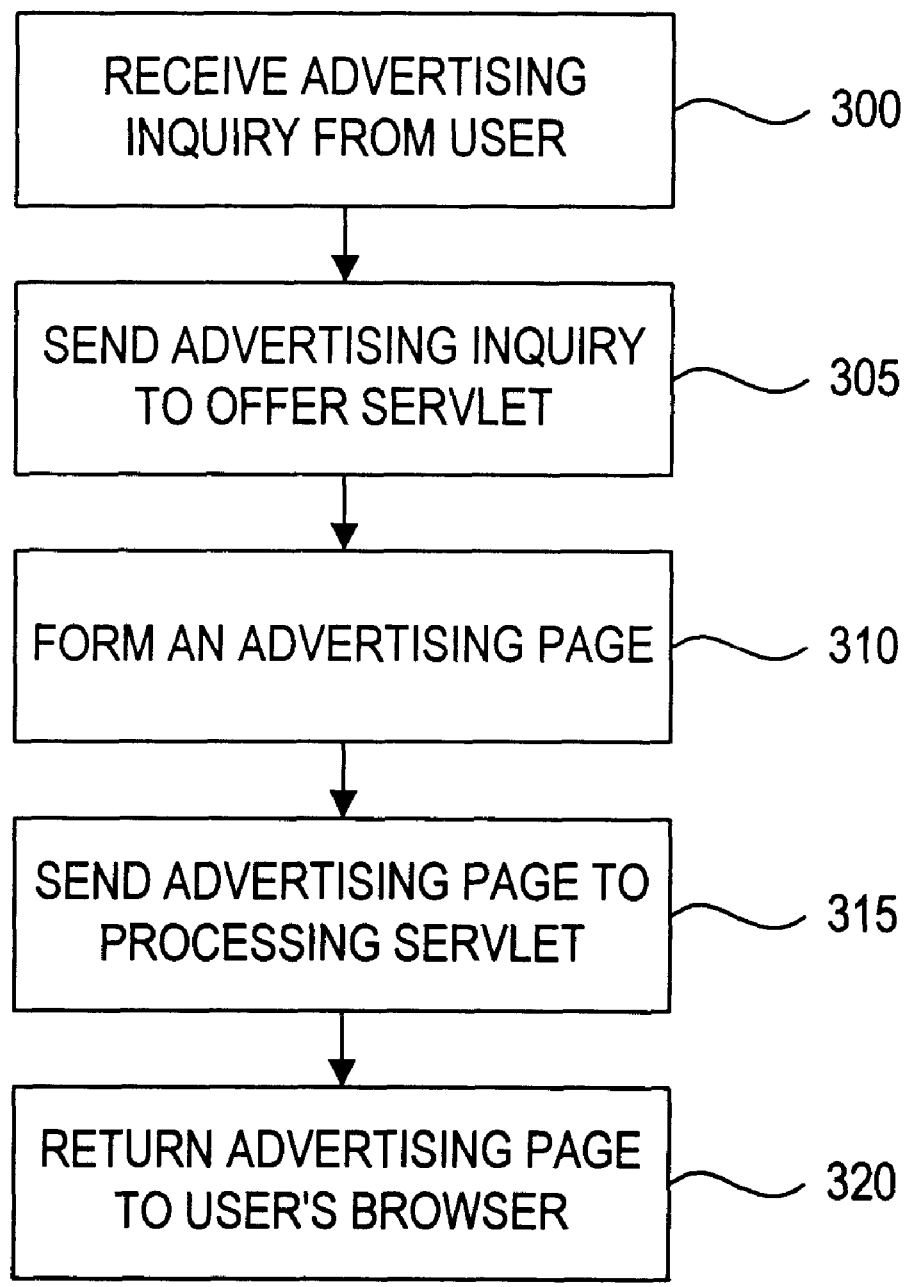
FIG. 8 is a flow chart of the steps taken in accordance with a further embodiment of the present invention.

In yet another embodiment, depicted in FIGS. 8 and 9, the processing servlet 30 is programmed to receive an advertising inquiry from the user in step 300 (arrow 11). The advertising inquiry is sent to the offer servlet 35 in step 305 (arrow 12). The offer servlet is programmed to form an advertising page in step 310. The formed advertising page is sent to the processing servlet in step 315 (arrow 13). The processing servlet returns the advertising page to the user's browser in step 320 (arrow 14). FIG. 9 illustrates an example of how an advertising inquiry is generated by a user. The illustrated web page contains a hyperlink advertising "Buy Product X." The user merely clicks on the hyperlink to receive an advertising page containing more information about Product X.

Previously, an Internet advertiser that desired to direct market goods or services over the Internet would purchase a database containing consumer data in order to obtain information about potential web users. The consumer data would include, for example, geo-demographic data, product usage information and/or marketing cluster information concerning millions of consumers. This database of consumer data allowed an Internet advertiser to target the advertising material a particular user saw on the advertiser server's web site. The problem with this system is that the companies selling the databases containing data about millions of users became concerned about the privacy rights of the users. In order to prevent concerns about privacy, the applicant developed a system that allows an advertiser server to purchase a database containing user data but not containing the identities of the users. Instead, a user identification number is provided that anonymously identifies each user's data so that the advertiser server can direct target advertising material to a particular user without having to know that user's identity.

Figure 10:
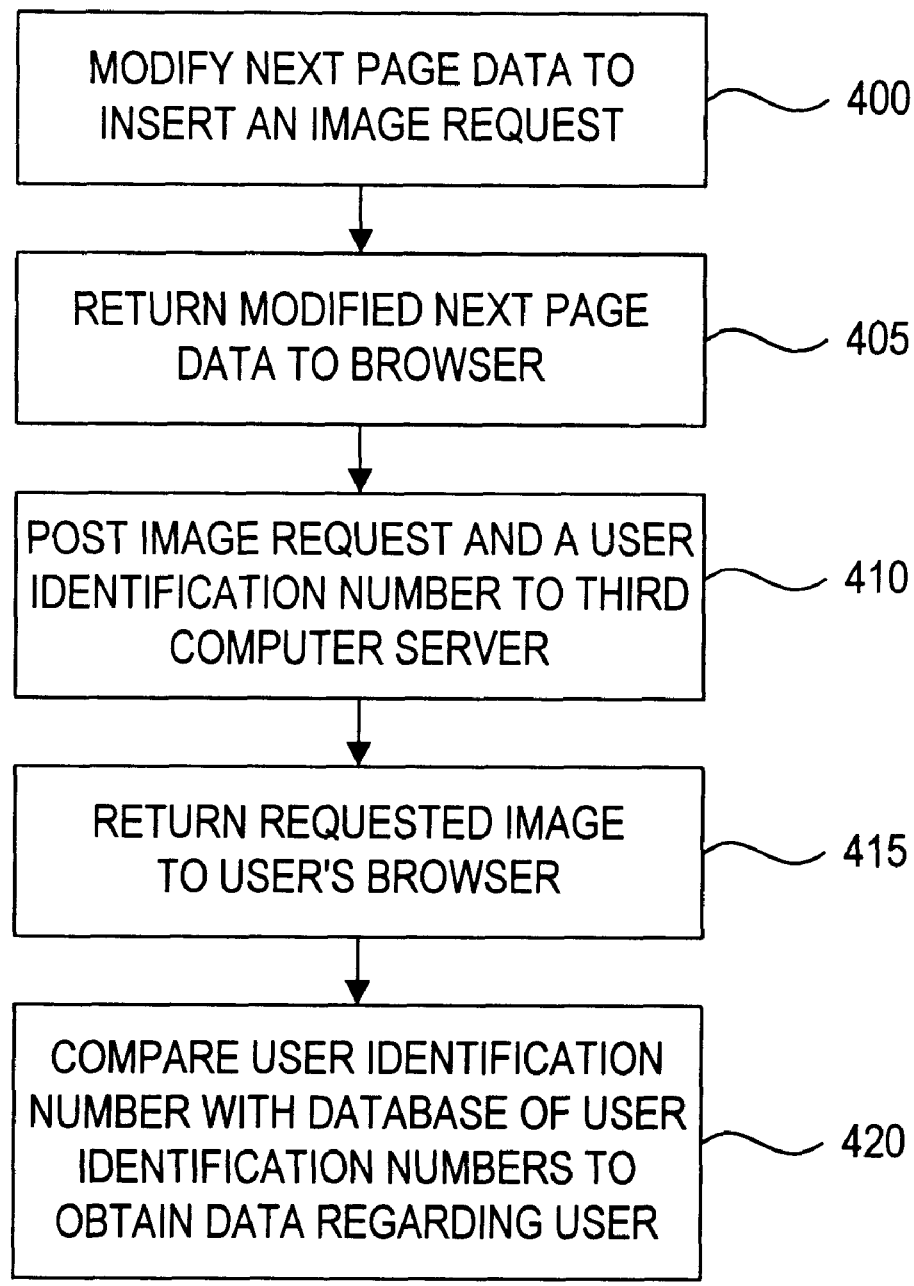
FIG. 10 is a flow chart of the steps taken in accordance with still another embodiment of the present invention.

FIGS. 2 and 10 illustrate how this new system operates. The processing servlet 30 is programmed to modify the next page data received from the server interface 22 such that the additional data associated with the registration information is sent, via the user's web browser, to a third server, such as advertiser server 50, illustrated in FIG. 2. This is done in such a manner as to enable the advertiser server 50 to target advertising to the user without having to know the identity of the user. This also preserves the privacy of the user while allowing an advertising company to direct market goods and services. The sending of additional data, such as geo-demographic data, to the advertiser server 50 proceeds as follows. In step 400, the processing servlet 30 modifies the next page data received from the server interface 22 (arrow 5) by, for example, inserting an image request. The processing servlet 30 returns the modified next page data to the user's web browser in step 405 (arrow 6*a*). The web browser then, in step 410, posts a URL that includes the image request and a user identification number to a third computer server, such as an advertiser server 50 (arrow 9). The content of an HTML image request that includes a user identification number is illustrated in FIG. 11. Typically the user identification number (idnum) is passed to the advertiser server 50 (company.com) as part of the source parameter (SRC) of the image request (IMG). The user identification number is a means for associating a user's registration information with the user without identifying the user to the advertiser server 50.

Referring again to FIGS. 2 and 10, the advertiser server 50 next returns the requested image to the user's browser in step 415 (arrow 10). Then, the advertiser server 50, in step 420, compares the obtained user identification number with a database 54 of such numbers to find a match. The database 54 is usually supplied by a company, such as a direct marketing company, which has already compiled consumer data concerning millions of people. The company supplying the database 54 may be, for example, the same company that developed and/or sold the processing servlet software to the owner of the web server 20 and/or the company operating the remote server 40. The database 54 contains data, such as geo-demographic data, product usage information and/or marketing cluster information corresponding to each user identification number but does not identify any of the users' identities. In this way, the advertiser server 50 can obtain data about the user without knowing the user's identity.

For example, as illustrated in FIG. 2, in one embodiment the processing servlet 30 receives next page data from the server interface 22 (arrow 5). The processing servlet 30 modifies the next page data to include an HTML image request and a user identification number. The image request's URL refers to the advertiser server 50. The processing servlet 30 returns the modified next page data to the user's web browser (arrow 6*a*). The user's web browser then posts the image request and the user identification number to the designated URL address, i.e., to the advertiser server 50 (arrow 9). The advertiser server 50 gets the image request and the user identification number that anonymously identifies the user. The advertiser server 50 then returns the requested image data 52 to the web browser (arrow 10). The image data 52 may include a one pixel by one pixel image that is not even visible to the user. Then, the advertiser server 50 compares the user identification number obtained in the image request with a database of user identification numbers to find a match. Each user identification number has additional data, such as geo-demographic data, associated with the corresponding user. This process insures privacy while allowing third parties to obtain additional data about potential customers.

Figure 12:
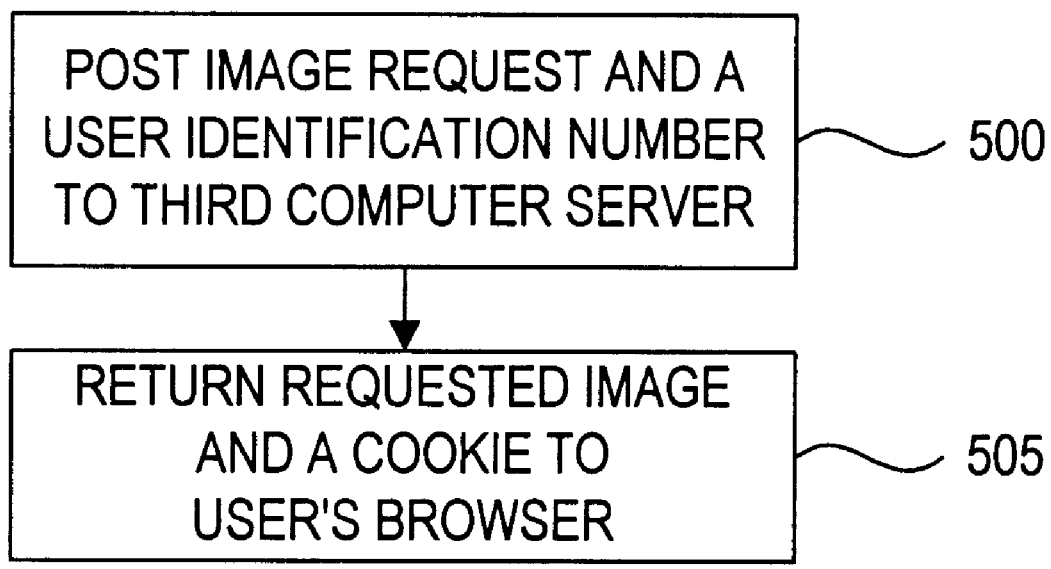
FIG. 12 is a flow chart of the steps taken in accordance with another embodiment of the present invention.

FIGS. 2 and 12 depict another embodiment of the present invention. According to this embodiment, the web browser posts, in step 500, the image request and the anonymous user identification number to the advertiser server 50 (arrow 9). The advertiser server 50 then returns, in step 505, the requested image data 52 and a cookie to the user's browser (arrow 10). The cookie passed back to the browser includes a cookie identification number which corresponds to the user identification number. The cookie stores information on the browser that corresponds to the web sites the user visits. This information and the cookie identification number are then sent back to the advertiser server 50 each time the web browser requests a web page from the advertiser server 50. Thus, the next time the user goes to the advertiser server's web site, the user's web browser will send the cookie and the cookie identification number to the advertiser server 50. The advertiser server 50 then correlates the cookie identification number with the corresponding user identification number so that the data known about the anonymous user can be used to present custom web pages to that user. In this way, the advertiser server 50 can determine what web sites the user visits in order to better target its direct advertising. Again, however, the user's identity is not known to the advertiser server 50.

The processing servlet 30 and the remote server 40 are each programmed to perform all of the above steps in real-time. Real-time, as used herein, is defined as performing a process in approximately 600 ms, not including network delay which is variable. The 600 ms will vary depending on the type and amount of data enhancement done. For example, according to one embodiment of the present invention, after a user submits his or her registration information, it takes approximately 600 ms for the computer system 10 to standardize and enhance registration data comprising the user's name, address and geo-demographic data and return the next web page.

While the present invention has been described with reference to one or more embodiments, those skilled in the art will recognize that many changes may be made thereto without departing from the spirit and scope of the present invention which is set forth in the following claims.

What is claimed is:

1. A computer system for processing data for an internet web site, the web site being run by a web server that includes a server interface and a processing servlet, said computer system comprising:

a processing servlet being programmed to accept registration information from a user of said internet web site and map said registration information from a native format to a universal format;

a remote server that is connected to said web server by the internet, said remote server being programmed to receive said universal format registration information, process said universal format registration information to produce final universal format registration information, send said final universal format registration information over the internet to said processing servlet;

said processing servlet being further programmed to map said final universal format registration information to final native format registration information;

said processing servlet and said remote server each being programmed to perform all of the above steps in real-time.

2. The computer system of claim 1 wherein said processing servlet is further programmed to post said final native format registration information to said server interface and receive next page data from said server interface.

3. The computer system of claim 2, wherein said processing servlet is further programmed to:

receive said message from a web browser;

modify said next page data to insert a request and a user identification number;

return said modified next page data to said web browser; and wherein said web browser posts a URL that includes said request and said user identification number to said third computer server.

4. The computer system of claim 3, wherein said third computer server is further programmed to compare said user identification number with a database of user identification numbers to find a match.

5. The computer system of claim 2, wherein said processing servlet is further programmed to return said next page data to said user.

6. The computer system of claim 2, further comprising an offer servlet that is programmed to:

receive said next page data from said processing servlet;

add advertising data to said next page data to form new next page data; and send said new next page data to said processing servlet.

7. The computer system of claim 1, wherein said processing servlet is further programmed to analyze said final universal format registration information.

8. The computer system of claim 7, wherein said processing servlet analyzes said final universal format registration information by determining whether said universal format registration information is invalid and, if said universal format registration information is invalid, whether to post an error page.

9. The computer system of claim 1, wherein said processing servlet is further programmed to:

receive an advertising inquiry from said user;

send said advertising inquiry to an offer servlet, said offer servlet being programmed to form an advertising page; and return said advertising page to said user.

10. The computer system of claim 1, wherein said remote server is programmed to process said universal format registration information by standardizing said universal format registration information.

11. The computer system of claim 1, wherein said remote server is programmed to process said universal format registration information by appending additional data to produce said final universal format registration information.

12. The computer system of claim 1, wherein said processing servlet is further programmed to filter said user data into a first category and a second category and wherein said first category of said registration information includes name and address data.

13. A processing servlet for use with a computer system for processing data for an internet web site, the system including a web server and a remote server that standardizes user data, the web server including a server interface and a processing servlet, said system comprising:

a processing servlet being programmed to accept a message including user data from a user of an internet web site, filter said user data into a first category to be processed and a second category to be saved, map said first category of said user data from a native format to a universal format, send said universal format user data over the internet to a remote computer server, receive final universal format user data over the internet from the remote computer server, map said final universal format user data to final native format user data;

wherein said system performs all of the above steps in real-time.

14. The processing servlet of claim 13 wherein said processing servlet is further programmed to:

post said final native format user data to the server interface;

receive next page data from the server interface; and return said next page data to the user.

15. The processing servlet of claim 14, wherein said processing servlet is further programmed to:

receive said message from a web browser;

modify said next page data to insert a request and a user identification number;

return said modified next page data to said web browser; and wherein said web browser posts a URL that includes said request and said user identification number to the third computer server.

16. The processing servlet of claim 15, wherein the third computer server is programmed to compare said user identification number with a database of user identification numbers to find a match.

17. The processing servlet of claim 14, further comprising an offer servlet that is programmed to:

receive said next page data from said processing servlet;

add advertising data to said next page data to form new next page data; and send said new next page data to said processing servlet.

18. The processing servlet of claim 13, wherein said processing servlet is further programmed to:

receive an advertising inquiry from said user;

send said advertising inquiry to an offer servlet, said offer servlet being programmed to form an advertising page and send said advertising page to said processing servlet; and return said advertising page to said user.

19. A method of using computer servers to process data for an internet web site, the web site being run by a web server that includes a server interface and a processing servlet, the method comprising the steps of:

using a processing servlet to accept a message from a user of said internet web site, said message including user data;

using said processing servlet to filter said user data into a first category to be processed and a second category to be saved;

using said processing servlet to map said first category of said user data from a native format to a universal format;

using said processing servlet to send said universal format user data over the internet to a remote computer server;

using a remote computer server to receive said universal format user data;

using said remote computer server to process said universal format user data to produce final universal format user data;

using said remote computer server to send said final universal format user data over the internet to said processing servlet;

using said processing servlet to analyze said final universal format user data;

using said processing servlet to map said final universal format user data to final native format user data;

using said processing servlet to post said final native format user data to said server interface;

using said processing servlet to receive next page data from said server interface; and using said processing servlet to return said next page data to said user;

wherein all of the above steps are performed in real-time.

20. The method of claim 19, wherein said processing servlet receives said message from a web browser, said method further comprising the steps of:

using said processing servlet to modify said next page data to insert a request and a user identification number;

using said processing servlet to return said modified next page data to a web browser; and using said web browser to post a URL that includes said request and said user identification number to said third computer server.

21. The method of claim 20, further comprising the step of:

using said third computer server to compare said user identification number with a database of user identification numbers to find a match.

22. The method of claim 19, further comprising the steps of:

using an offer servlet to receive said next page data from said processing servlet;

using said offer servlet to add advertising data to said next page data to form new next page data;

using said offer servlet to send said new next page data to said processing servlet; and using said processing servlet to send said new next page data to said user.

23. The method of claim 19, further comprising the steps of:

using said processing servlet to receive an advertising inquiry from said user;

using said processing servlet to send said advertising inquiry to an offer servlet;

using said offer servlet to form an advertising page;

using said offer servlet to send said advertising page to said processing servlet; and using said processing servlet to send said advertising page to said user.

24. The method of claim 19, wherein said first category of said user data includes name and address data.

25. The method of claim 19, wherein said first category of said user data includes address data.

26. The method of claim 19, wherein said first category of said user data includes telephone number data.

27. A computer system for processing data for an internet web site, the web site being run by a web server that includes a server interface and a processing servlet, the computer system comprising:

a processing servlet being programmed to accept a message including user data from a user of said internet web site, filter said user data into a first category to be processed and a second category to be saved and map said first category of said user data from a native format to a universal format;

a remote server that is connected to said web server by the internet, said remote server being programmed to receive said universal format user data, process said universal format user data to produce final universal format user data and send said final universal format user data over the internet to said processing servlet;

said processing servlet being further programmed to analyze said final universal format user data, map said final universal format user data to final native format user data, post said final native format user data to said server interface and receive next page data from said server interface;

said processing servlet and said remote server each being programmed to perform all of the above steps in real-time.

28. The computer system of claim 27, wherein said processing servlet is further programmed to receive said message from a web browser, modify said next page data to insert a request and a user identification number, return said modified next page data to said web browser;

wherein said web browser posts a URL that includes said request and said user identification number to said third computer server.

29. The computer system of claim 28, wherein said third computer server is further programmed to compare said user identification number with a database of user identification numbers to find a match.

30. The computer system of claim 27, wherein said processing servlet is further programmed to return said next page data to said user.

31. The computer system of claim 27, further comprising an offer servlet that is programmed to receive said next page data from said processing servlet, add advertising data to said next page data to form new next page data and send said new next page data to said processing servlet.

32. The computer system of claim 27, wherein said processing servlet is further programmed to:
  receive an advertising inquiry from said user,
  send said advertising inquiry to an offer servlet, said offer servlet being programmed to form an advertising page and send said advertising page to said processing servlet; and
  and return said advertising page to said user.

33. A computer system for targeting advertisements to a user without knowing the user identify, said system comprising:
  a web server including a processing servlet that is programmed to modify next page data to insert a request and a user identification number and return said modified next page data to a web browser;
  said web browser posting a URL that includes said request and said user identification number to a third computer server;
  said third computer server being programmed to return said requested data and a cookie to said web browser, said cookie including a cookie identification number corresponding to said user identification number;
  wherein said system performs all of the above steps in real-time.

34. The computer system of claim 33, wherein when said web browser thereafter requests a page from said third computer server, said browser sends said cookie and said cookie identification number back to said third computer server.

35. The computer system of claim 34, wherein said third computer server correlates said cookie identification number with said user identification number corresponding to said cookie identification number.

36. A remote server for use with a computer system for processing data for internet web sites, the web sites being run by a plurality of web servers that each include a server interface and a processing servlet, each of the processing servlets being programmed to accept a message including user data from a user of one of the internet web sites, each of the processing servlets being further programmed to map the user data from a native format to a universal format, wherein:
  a remote server is adapted to be connected to a plurality of web servers by the internet;
  said remote server being programmed to receive the universal format user data from a processing servlet, process the universal format user data to produce final universal format user data that includes standardized address data and send said final universal format user data over the internet to the processing servlet that originally sent the universal format user data;
  wherein said remote server performs all of the above steps in real-time.

37. The remote server of claim 36, wherein said remote server is further programmed to process the universal format user data by appending additional data to produce the final universal format user data.

38. A method of processing electronically captured address information, the address information being entered into an electronic environment including a processing servlet, the method comprising the steps of:
  using a processing servlet to accept said electronically captured address information;
  using said processing servlet to map said electronically captured address information from a native format to a universal format;
  using said processing servlet to send said universal format address information to a remote computer server;
  using a remote computer server to receive said universal format address information;
  using said remote computer server to process said universal format address information to produce final universal format address information;
  using said remote computer server to send said final universal format address information to said processing servlet;
  using said processing servlet to analyze said final universal format address information;
  using said processing servlet to map said final universal format address information to final native format address information; and
  using said processing servlet to post said final native format address information to said electronic environment;
  wherein all of the above steps are performed in real-time.

39. The method of claim 38, further comprising the step of:
  using said remote computer server to return additional data to said processing servlet, said additional data being associated with said electronically captured address information sent to said remote computer server.

40. A method of providing information obtained from a user to a third computer server without identifying the user, the information being provided by a web browser to a web server that includes a processing servlet, said method comprising the steps of:
  using a processing servlet to modify next page data to insert an image request and a user identification number;
  using said processing servlet to return said modified next page data to a web browser; and
  using a web browser to post a URL that includes said image request and said user identification number to the third computer server.

41. The method of claim 40, further comprising the steps of:
  using the third computer server to return an image to the web browser; and
  using the third computer server to compare said user identification number with a database of user identification numbers to find a match.

42. A processing servlet for communicating data about a user to a third computer server without identifying the user to the third computer server, wherein:
  a processing servlet is programmed to receive a message from a web browser, modify next page data to insert a request and a user identification number and return said modified next page data to said web browser;
  wherein said web browser posts a URL that includes said request and said user identification number to the third computer server.

43. The processing servlet of claim 42, wherein the third computer server is programmed to compare said user identification number with a database of user identification numbers to find a match.

44. A third computer server for receiving information about a user without knowing the identity of said user, the information being provided via a web browser, wherein:

a third computer server is programmed to receive an image request and a user identification number, compare said user identification number with a database of user identification numbers to find a match and retrieve information corresponding to said user identification number.

45. The third computer server of claim 44 wherein said third computer server is further programmed to return an image to the web browser.

\* \* \* \* \*

UNITED STATES PATENT AND TRADEMARK OFFICE
CERTIFICATE OF CORRECTION

PATENT NO. : 6,144,988
DATED : November 7, 2000
INVENTOR(S) : George T. Kappel

It is certified that error appears in the above-identified patent and that said Letters Patent is hereby corrected as shown below:

Column 15, Claim 33, Line 10    replace "identify" with --identity--.

--

Signed and Sealed this

Twenty-fourth Day of April, 2001

Attest:

NICHOLAS P. GODICI

Attesting Officer    Acting Director of the United States Patent and Trademark Office